(12) United States Patent
Heelan, Jr. et al.

(10) Patent No.: US 7,828,340 B2
(45) Date of Patent: Nov. 9, 2010

(54) COUPLING

(75) Inventors: Raymond V. Heelan, Jr., Warren, PA (US); Gary M. Gustafson, Lakewood, NY (US)

(73) Assignee: Allegheny Coupling Company, Warren, PA (US)

( * ) Notice: Subject to any disclaimer, the term of this patent is extended or adjusted under 35 U.S.C. 154(b) by 913 days.

(21) Appl. No.: 11/583,947

(22) Filed: Oct. 18, 2006

(65) Prior Publication Data

US 2008/0136167 A1    Jun. 12, 2008

(51) Int. Cl.
*F16L 23/06*    (2006.01)
*F16L 23/10*    (2006.01)

(52) U.S. Cl. .................. 285/409; 285/366; 285/410; 285/411

(58) Field of Classification Search .................. 285/38, 285/367, 409, 420, 366, 410, 411; 24/273
See application file for complete search history.

(56) References Cited

U.S. PATENT DOCUMENTS

| | | | | | |
|---|---|---|---|---|---|
| 144,997 | A | * | 11/1873 | Mayall | ......... 285/252 |
| 740,664 | A | * | 10/1903 | Kroll | ......... 285/111 |
| 957,695 | A | | 5/1910 | Marek | |
| 1,162,362 | A | * | 11/1915 | Hyland | ......... 285/409 |
| 1,185,487 | A | * | 5/1916 | Eastman | ......... 285/119 |
| 1,518,479 | A | * | 12/1924 | Brewer | ......... 285/409 |
| 1,646,463 | A | * | 10/1927 | Stokesberry | ......... 285/409 |
| 2,689,141 | A | * | 9/1954 | Kiekhaefer | ......... 285/409 |
| 2,731,280 | A | | 1/1956 | Goodliffe et al. | |
| 2,752,174 | A | * | 6/1956 | Frost | ......... 285/409 |
| 2,775,806 | A | * | 1/1957 | Love | ......... 24/271 |
| 2,834,087 | A | * | 5/1958 | Herman | ......... 24/279 |
| 2,882,071 | A | * | 4/1959 | Klompar | ......... 285/409 |
| 3,113,791 | A | | 12/1963 | Frost et al. | |
| 3,476,410 | A | | 11/1969 | Pastva, Jr. | |
| 3,695,638 | A | | 10/1972 | Blakely | |
| 3,705,737 | A | * | 12/1972 | Westerlund et al. | ......... 285/365 |
| 3,964,774 | A | * | 6/1976 | Wollin et al. | ......... 285/409 |
| 4,041,975 | A | | 8/1977 | Ames | |
| 4,123,095 | A | * | 10/1978 | Stehlin | ......... 285/409 |
| 4,272,871 | A | | 6/1981 | Weinhold | |
| 4,311,248 | A | | 1/1982 | Westerlund et al. | |
| 4,341,406 | A | | 7/1982 | Abbes et al. | |
| 4,496,176 | A | * | 1/1985 | Weinhold | ......... 285/365 |
| 4,573,717 | A | * | 3/1986 | Peacock | ......... 285/365 |
| 4,611,839 | A | | 9/1986 | Rung et al. | |
| 4,639,020 | A | | 1/1987 | Rung et al. | |

(Continued)

*Primary Examiner*—James M Hewitt
(74) *Attorney, Agent, or Firm*—The Webb Law Firm

(57) ABSTRACT

A coupling including a shell with shell arms, where ends of the shell arms are removably attached by a hinge assembly. A securing assembly releasably secures ends of the shell arms in an abutting relationship and includes a handle rotatably attachable at an end of a shell arm. The handle includes a handle body, a hinge orifice extending through a portion of the handle body, and a hinge pin extending through the hinge orifice. The hinge pin includes an orifice extending therethrough. The securing assembly also includes a substantially T-shaped bail having an arm with a first end and a base portion having an engagement member extending substantially transversely with respect to the bail arm. The engagement member mates with a groove positioned on the boss attached at or near an end of the other arm, and an end of the bail arm extends through the hinge pin orifice.

25 Claims, 7 Drawing Sheets

U.S. PATENT DOCUMENTS

| | | | |
|---|---|---|---|
| 4,639,979 A * | 2/1987 | Polson ........................ 482/107 |
| 4,643,460 A * | 2/1987 | Lieberg ....................... 285/112 |
| 4,678,208 A | 7/1987 | De Raymond |
| 4,697,742 A | 10/1987 | Schnipke |
| 4,807,499 A | 2/1989 | Martinez |
| 4,969,923 A * | 11/1990 | Reeder et al. ................ 285/365 |
| 5,018,768 A | 5/1991 | Palatchy |
| 5,048,578 A | 9/1991 | Dorf et al. |
| 5,104,153 A | 4/1992 | Corcoran |
| 5,209,528 A | 5/1993 | Weh et al. |
| 5,230,537 A | 7/1993 | Newman |
| 5,380,052 A * | 1/1995 | Hendrickson ................ 285/364 |
| 5,401,062 A | 3/1995 | Vowles |
| 5,415,435 A | 5/1995 | Colbert |
| 5,501,122 A | 3/1996 | Leicht et al. |
| 5,522,625 A * | 6/1996 | Flick et al. ................... 285/409 |
| 5,533,764 A | 7/1996 | Williamson |
| 5,540,465 A | 7/1996 | Sisk |
| 5,586,367 A * | 12/1996 | Benoit ....................... 24/68 SK |
| 5,645,303 A | 7/1997 | Warehime et al. |
| 5,647,612 A | 7/1997 | Yoshida et al. |
| 5,662,011 A | 9/1997 | Habermehl |
| 5,722,666 A | 3/1998 | Sisk |
| 5,791,671 A | 8/1998 | Tang et al. |
| 5,873,611 A * | 2/1999 | Munley et al. ............... 285/367 |
| 5,988,694 A * | 11/1999 | Brushaber ..................... 285/81 |
| 6,109,145 A | 8/2000 | Habermehl |
| 6,145,896 A | 11/2000 | Vitel et al. |
| 6,533,332 B2 | 3/2003 | Vitel et al. |
| 6,672,631 B1 * | 1/2004 | Weinhold ................... 285/409 |
| 6,811,191 B2 * | 11/2004 | Mills .......................... 285/409 |
| 6,851,342 B2 | 2/2005 | Dugan et al. |
| 6,904,835 B2 | 6/2005 | Dugan et al. |
| 7,004,512 B2 * | 2/2006 | Antonelli et al. ............. 285/365 |
| 7,165,789 B2 * | 1/2007 | Burian et al. ................ 285/420 |
| 7,240,930 B2 * | 7/2007 | Stravitz ....................... 285/419 |
| 7,290,805 B2 * | 11/2007 | Wu ............................ 285/365 |
| 2004/0061335 A1 * | 4/2004 | Mills .......................... 285/409 |

\* cited by examiner

COUPLING

BACKGROUND OF THE INVENTION

1. Field of the Invention

The present invention relates generally to devices for coupling or releasably attaching parts together, and specifically to a coupling for use in connecting or attaching two pipe ends, such as two pipe ends in a process, two hopper tees or other fittings via pipe or tube in a transportation vehicle or other related system.

2. Description of Related Art

In the field of pipe coupling, such coupling members, clamps and similar devices are used to connect the ends of pipes together. For example, in the area of dry bulk handling, such couplings or clamps are used to connect sections of pipe or hopper tees in connection with a bulk transportation vehicle. The use of these couplings ensures that external and/or hostile contamination does not occur, and, further, such couplings are used in the unloading of the material that is being transported, such as dry bulk powders, pellets and the like.

In the dry bulk industry, such tank cars are unloaded through valves positioned at the bottom of a material container. Further, in order to prevent cross contamination, the material container must be completely evacuated to ensure that varying material loads do not come in contact. In addition, in order to allow for appropriate adjustment of the coupling, some adjustment assembly should be used to allow for wear-and-tear and loosening of the clamping function of the coupling.

According to the prior art, and as seen in U.S. Pat. No. 5,540,465 to Sisk, a pipe, valve or tee coupler is disclosed. The coupler 30 includes two clamping arms 32, 34, and, at one end of each arm 32, 34 a hinge 40 integrally formed therewith. A bail lever 56 is attached to a mount 46. The walls of the clamping arms 32, 34 define a seat for a gasket 150, which will contact and seal against the pipe ends. An adjustable bail assembly 80 is pivotally attached to the bail lever 56 and includes a U-shaped bail 82 with opposed arms 84, 86. Each arm 84, 86 of the bail 82 terminates in a threaded portion 88, 90 and extends through a respective orifice on a pivot rod 92 extending through the lever 56. A pair of pivotal spacers 102, 104 are positioned on the rod 92 on each side of the lever 56, and these spacers 102, 104 are mounted to the bail lever 56.

The adjustment assembly of the Sisk patent includes a first tightening nut 106 engaged on threaded portion 88 above rod end 95, a second tightening nut 108 engaged on threaded portion 88 below rod end 95, a third tightening nut 110 engaged on threaded portion 90 above rod end 98 and a fourth tightening nut 112 engaged on threaded portion 90 below rod end 98. It is these tightening nuts 106, 108, 110, 112 and associated operational structure that form an assembly that allows for the adjustment of the bail 82 and its interaction with a boss 124 formed on the second end of claiming arm 34, specifically in a groove 125 formed therein. The coupler of the Sisk patent also requires planar extensions or ribs positioned on the various side walls of the clamping arms 32, 34 in order to engage specified pipe surfaces. U.S. Pat. No. 5,722,666, also to Sisk, is directed to a gasket for use in connection with the coupler 30 discussed above.

Couplings are used for connecting pipes, tees and other parts together, as is known in the art. There are many references that disclose couplers having various means for attaching two semi-circular shell arms, for use in connecting parts together. For example, such prior art coupling systems and mechanisms are disclosed in U.S. Pat. No.: 6,533,332 to Vitel et al.; U.S. Pat. No. 5,647,612 to Yoshida et al.; U.S. Pat. No. 5,415,435 to Colbert; U.S. Pat. No. 5,209,528 to Weh et al.; U.S. Pat. No. 5,104,153 to Corcoran; U.S. Pat. No. 5,018,768 to Palatchy; U.S. Pat. No. 4,311,248 to Westerlund et al.; U.S. Pat. No. 4,272,871 to Weinhold; U.S. Pat. No. 4,041,975 to Ames; U.S. Pat. No. 3,695,638 to Blakeley; U.S. Pat. No. 3,476,410 to Pastva; U.S. Pat. No. 3,113,791 to Frost et al.; U.S. Pat. No. 2,731,280 to Goodliffe et al.; and U.S. Pat. No. 957,695 to Marek. All of these couplings, while effective in coupling two parts together, such as the ends of two pipes, have many drawbacks.

One drawback of these prior art couplings is the lack of safety precautions that protect against tampering, removal or accidental opening. These couplings, as disclosed, are easily opened by an unauthorized person who simply has the means or tools to open the latching mechanism. For example, with respect to the coupling of the Sisk patent, even if the handle is secured to one of the coupling arms, an unauthorized person need only use the appropriate tools to loosen and remove tightening nuts 106, 108, and remove the bail, thereby gaining the ability to open the arms.

Another drawback to the prior art couplings is the difficulty of closing and locking the arms in operation, especially during the initial openings and closings of the coupling. Due to the rigidity of the bail or other lever or handle, the locking mechanism is inflexible and requires excessive force to open and close. Therefore, in using many of these prior art couplings, the user is required to utilize additional tools to actuate the handle and latch or unlatch coupling.

Yet another drawback of the prior art is the pinch point that occurs at the hinge joint of the coupling arms. Such a pinch point can damage the gaskets or packing of the coupled parts, and also applies undesirable forces and pressures during the coupling process. Still further, when the coupling is using a gasket or other sealing means seated within the arms of the coupling, the pinch point can also compress, break or tear the gasket, thereby rendering the seal ineffective.

SUMMARY OF THE INVENTION

It is, therefore, an object of the present invention to provide a coupling that overcomes the deficiencies and drawbacks of the prior art couplings, especially in the field of dry bulk couplings in transportation, transfer and storage systems. It is another object of the present invention to provide a coupling that allows for the appropriate adjustment of the latching mechanism in order to adjust for wear. It is yet another object of the present invention to provide a coupling that includes protections against tampering, removal or accidental opening. It is a further object of the present invention to provide a coupling that is easily closed and locked in operation, especially during the initial openings and closings of the coupling. It is a still further object of the present invention to provide a coupling that removes any pinch points that would otherwise occur at the hinge joint of the coupling arms.

Accordingly, the present invention is directed to a coupling having a shell with two semi-circular shell arms, each with a first end and a second end, the first ends of the shell arms moveably attached by a hinge assembly. A securing assembly releasably secures the second ends of the shell arms in a substantially abutting relationship. Further, the securing assembly includes a handle rotatably attached at or near the second end of one of the first shell arm or second shell arm. The handle has a handle body; at least one hinge orifice extending through at least a portion of the handle body; and a hinge pin extending through the at least one hinge orifice, the hinge pin having an orifice extending therethrough. The coupling further includes a substantially T-shaped bail having an arm with a first end and a base portion having an engagement member extending substantially transversely with respect to the bail arm. The engagement member is configured to mate with a groove positioned on a boss attached at or near the second end of the other of the first shell arm or second shell arm, and the first end of the bail arm extends through the hinge pin orifice.

The present invention is further directed to a coupling having a shell with two semi-circular shell arms, each with a first end and a second end, the first ends of the shell arms moveably attached by a hinge assembly. A securing assembly releasably secures the second ends of the shell arms in a substantially abutting relationship. Further, the securing assembly includes a handle rotatably attached at or near the second end of one of the first shell arm or second shell arm. The handle has a handle body; at least one hinge orifice extending through at least a portion of the handle body; and a hinge pin extending through the at least one hinge orifice, the hinge pin having an orifice extending therethrough. The coupling further includes a substantially T-shaped bail having an arm with a first end and a base portion having an engagement member extending substantially transversely with respect to the bail arm. The engagement member is configured to mate with a groove positioned on a boss attached at or near the second end of the other of the first shell arm or second shell arm, and the first end of the bail arm extends through the hinge pin orifice. The bail arm includes a flexion portion for providing spring action to the bail while closing the handle.

The present invention is also directed to a coupling having a shell with two semi-circular shell arms, each with a first end and a second end. The first ends of the shell arms are moveably attached by a double hinge assembly. The coupling includes a securing assembly to releasably secure the second ends of the shell arms in a substantially abutting relationship. Further, the securing assembly includes a handle rotatably attached at or near the second end of one of the first shell arm or second shell arm, and the handle has: a handle body; at least one hinge orifice extending through at least a portion of the handle body; and a hinge pin extending through the at least one hinge orifice, the hinge pin having an orifice extending therethrough. The securing assembly also includes a substantially T-shaped bail having an arm with a first end and a base portion having an engagement member extending substantially transversely with respect to the bail arm. The engagement member is configured to mate with a groove positioned on a boss attached at or near the second end of the other of the first shell arm or second shell arm, and the first end of the bail arm extends through the hinge pin orifice.

The present invention is still further directed to a method of manufacturing a coupling for use in attaching two pipe ends. The method includes the steps of: (a) forming a shell having two semi-circular shell arms, each with a first end and a second end; (b) moveably attaching the first ends of the shell arms by a hinge assembly; (c) releasably securing the second ends of the shell arms in a substantially abutting relationship by: (i) rotatably attaching a handle at or near the second end of one of the first arm or second arm, the handle having: (1) a handle body; (2) at least one hinge orifice extending through at least a portion of the handle body; and (3) a hinge pin extending through the at least one hinge orifice, the hinge pin having an orifice extending therethrough; (ii) providing a substantially T-shaped bail having an arm with a first end and a base portion having an engagement member extending substantially transversely with respect to the bail arm; (iii) attaching a boss at or near the second end of the other of the first shell arm or second shell arm, the boss having a groove for receiving the engagement member of the bail arm; and (iv) extending the first end of the bail arm through the hinge pin orifice.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
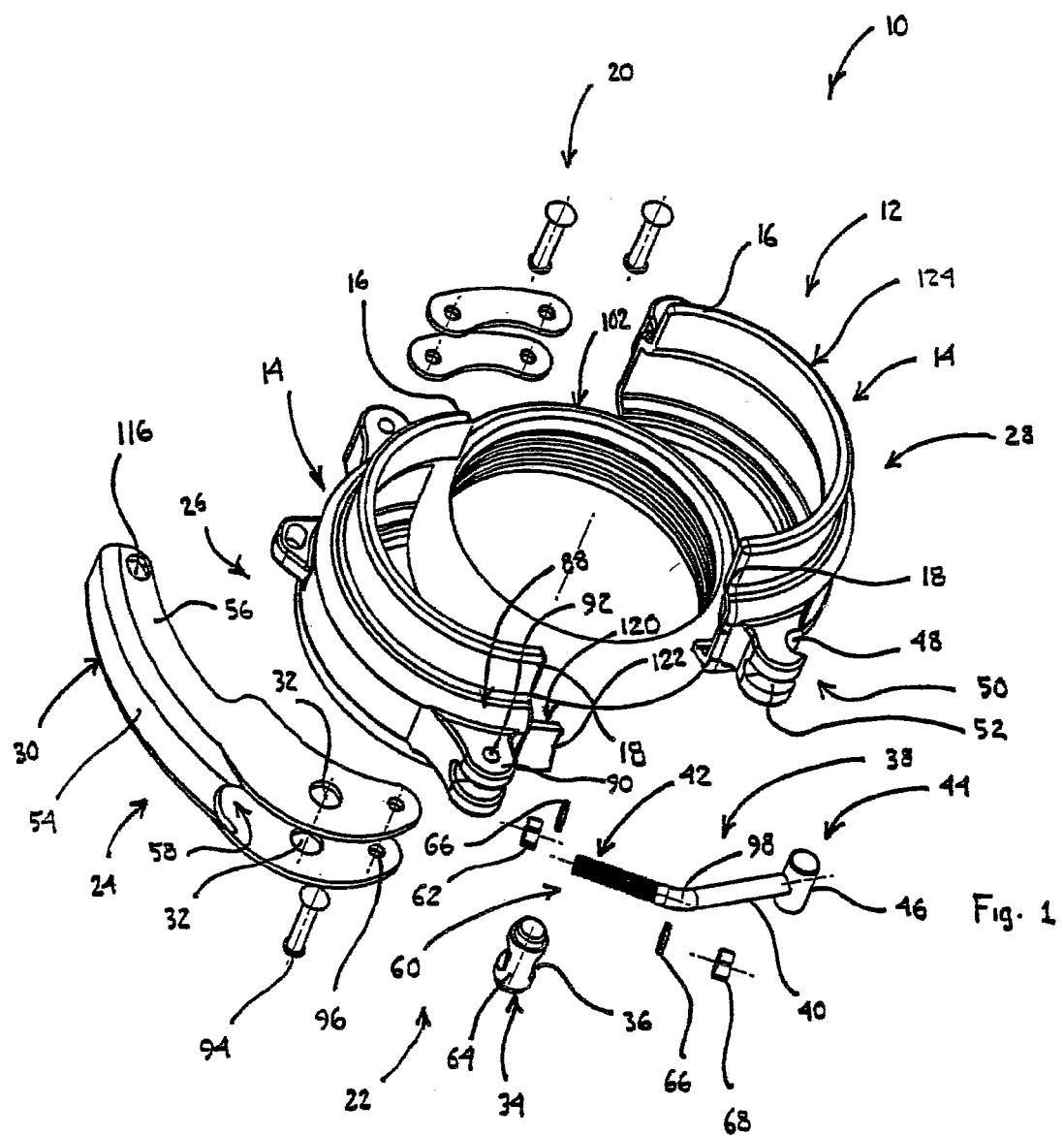
FIG. 1 is an exploded view of one embodiment of a coupling according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention is directed to a coupling 10 that can be used in a variety of applications. For example, the presently-invented coupling 10 can be used to releasably attach parts together, such as attaching two pipe ends or conduits. In one application, the coupling 10 can be used to attach two pipe ends in a process, two hopper tees in a transportation vehicle or other related system. Accordingly, the coupling 10 of the present invention may be used in a variety of applications in order to releasably couple or attach various members. For example, this coupling 10 is particularly useful in attaching sections of pipe or hopper tees on a bulk transportation vehicle, which ensures that external and/or hostile contamination does not occur. Still further, the coupling 10 can be used in an unloading system, such as for use in unloading of material that is being transported, e.g., dry bulk powders, pellets, etc.

As seen in one embodiment in FIG. 1, the coupling 10 includes a shell 12 having two semi-circular shell arms 14. Each shell arm 14 has a first end 16 and a second end 18. The first end 16 of the shell arms 14 are movably attached together. In particular, a hinge assembly 20 allows the shell arms 14 to hingedly move with respect to each other in a plane of movement. Accordingly, the shell arms 14 may be opened and closed, such that the second ends 18 of the shell arms 14 can be moved between an abutting and a spaced position. When the shell arms 14 are in a closed position, where the second ends 18 of the shell arms 14 are abutting, the two shell arms 14 form a substantially circular shell 12.

In order to releasably secure the second ends 18 of the shell arms 14, a securing assembly 22 is utilized. Specifically, the securing assembly 22 allows the second ends 18 of the shell arms 14 to be releasably secured in a substantially abutting relationship. In addition, the securing assembly 22 includes a handle 24, which is rotatably attached at or near the second end 18 of either the first shell arm 26 or the second shell arm 28.

The handle 24 includes a handle body 30, as well as at least one hinge orifice 32, which extends through at least a portion of the handle body 30. In addition, the handle 24 includes a hinge pin 34 extending through the hinge orifice 32. The hinge pin 34 includes an orifice 36 extending therethrough.

The securing assembly 22 also includes a substantially T-shaped bail 38. The bail 38 includes an arm 40 with a first end 42 and a base portion 44. Further, the base portion 44 includes an engagement member 46, which extends substantially transversely with respect to the bail arm 40.

The engagement member 46 is configured, sized and/or shaped to mate with a groove 48 positioned on a boss 50, which is attached at or near the second end 18 of the other of the first shell arm 26 or second shell arm 28. Accordingly, the boss 50 is positioned on the second end 18 of the shell arm 14 that is opposing the second end 18 of the shell arm 14 where the handle 24 is rotatably attached.

Figure 6:
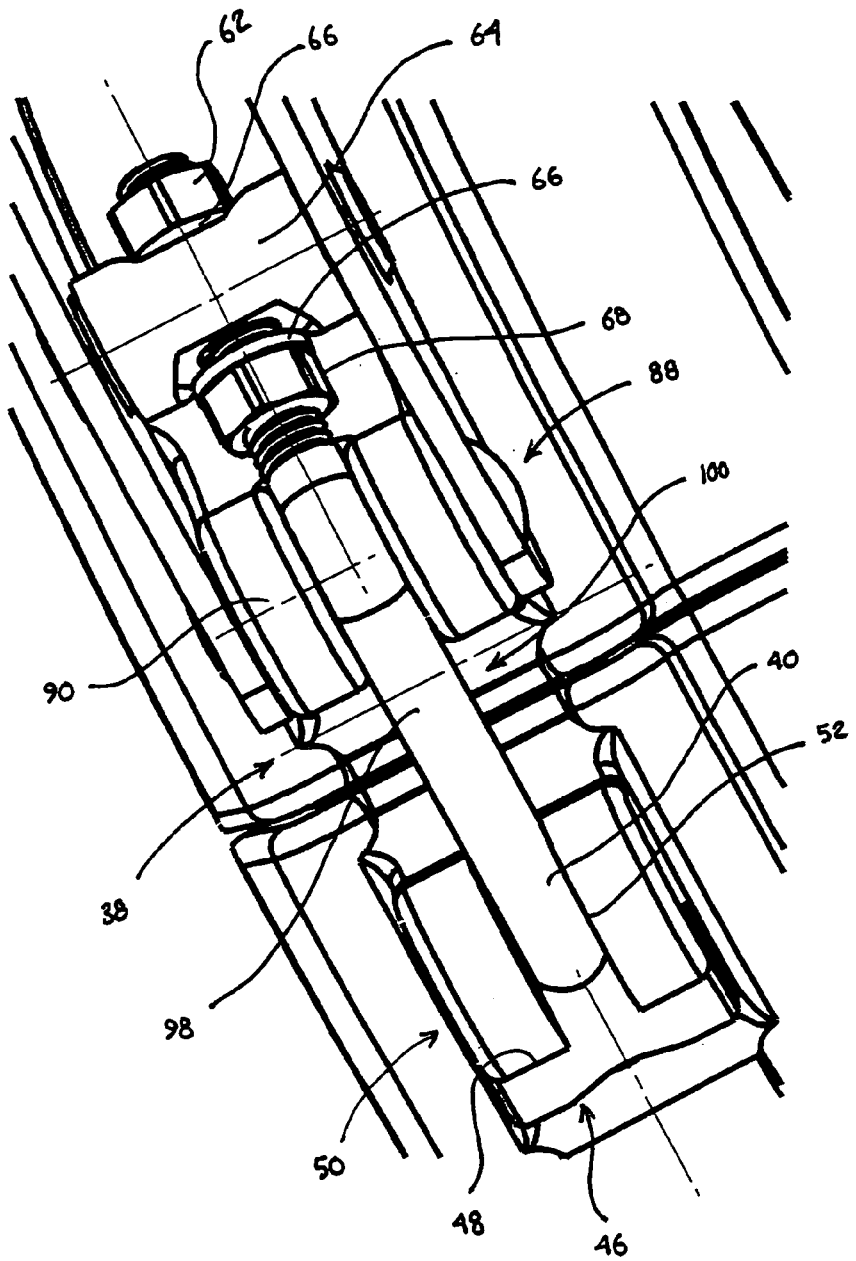
FIG. 6 is an expanded perspective view of another portion of the coupling of FIG. 2.
Figure 7:
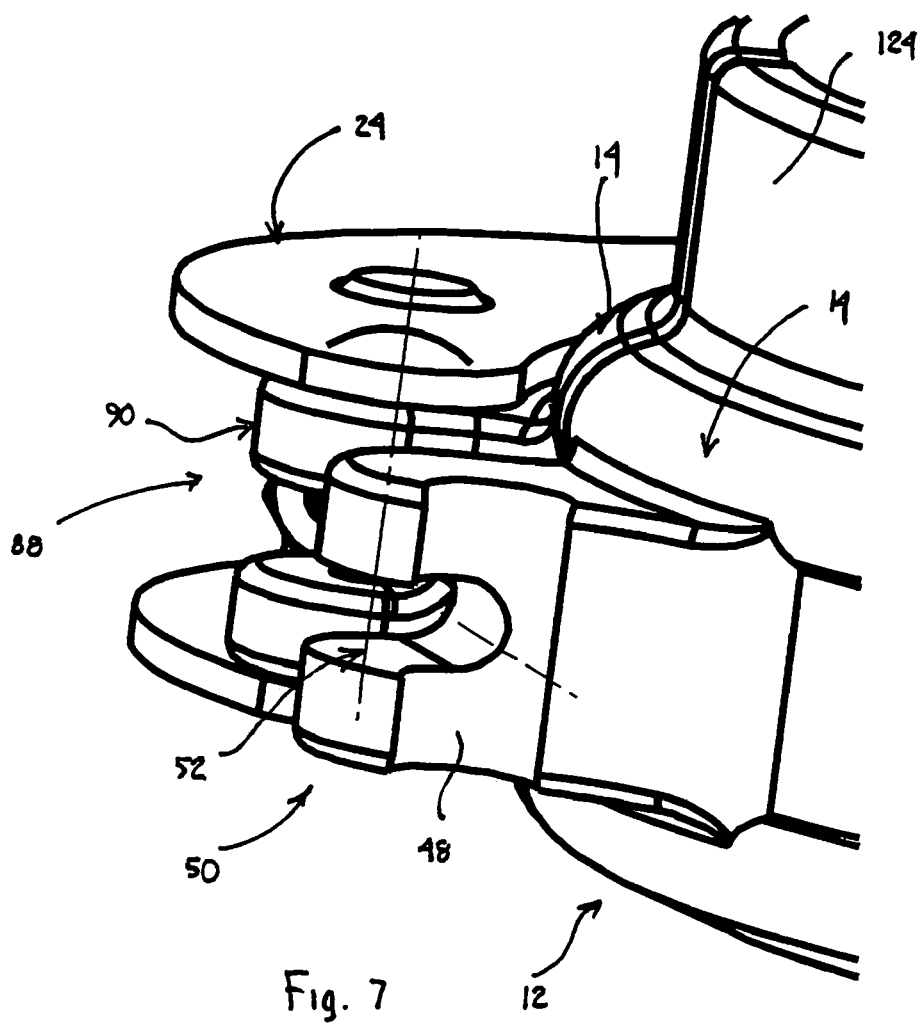
FIG. 7 is an expanded perspective view of a still further portion of the coupling of FIG. 2.

As best seen in FIGS. 1, 3, 6 and 7, the boss 50, in one preferred and non-limiting embodiment, includes a slot 52. This slot 52 extends substantially transversely with respect to the groove 48 of the boss 50. In addition, the slot 52 is configured, sized and/or shaped to seat at least a portion of the bail arm 40 that is substantially adjacent the engagement member 46. Therefore, it is the base portion 44 of the arm 40, and specifically the engagement member 46, that forms the T-shaped structure, where the top of the T-shaped structure (or the engagement member 46) is capable of seating in the groove 48 and slot 52. This arrangement is best illustrated in FIGS. 6 and 7.

Figure 2:
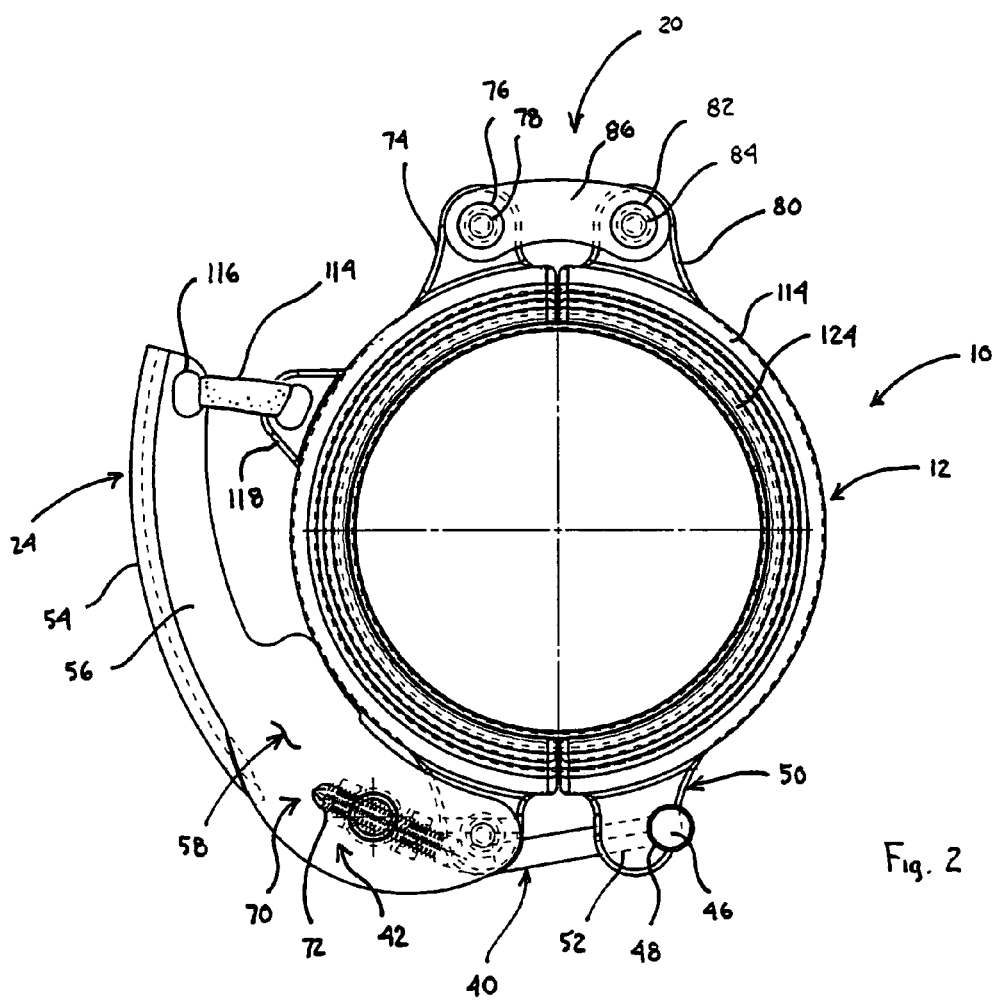
FIG. 2 is a side view of another embodiment of a coupling according to the present invention.

In another preferred and non-limiting embodiment, the first end 42 of the bail arm 40 is positioned substantially adjacent or at least partially within the handle body 30. In particular, as best seen in FIG. 2, the first end 42 of the bail arm 40 may be positioned within or behind an outer wall 54 of the handle body 30. In this arrangement, the handle body 30 includes the aforementioned outer wall 54, as well as at least two sidewalls 56, which forms an inner area 58. Each sidewall 56 includes a respective hinge orifice 32, and the hinge pin 34 extends through each of these hinge orifices 32. In addition, in this arrangement, the hinge pin 34 extends through each hinge orifice 32, and the hinge pin orifice 36 extends through a substantially central portion of the hinge pin 34. Still further, the first end 42 of the bail arm 40 extends through the hinge pin orifice 36, such that the bail 38 is rotatable and movable with respect to the handle 24 via the rotating hinge pin 34.

In this embodiment, the location of the first end 42 of the bail arm 40 in the inner area 58 of the handle body 30 provides exceedingly limited access to the bail 38 when the bail 38 and handle 24 are engaged. Specifically, this arrangement will deny access to the lading or coupled parts, which represents a great benefit over the prior art U-shaped bail designs. Since the first end 42 is nested within the confines or inner area 58 of the handle body 30, access is limited when the handle 24 is closed, and when the handle 24 is open, the first end 42 of the bail arm 40 is accessible.

Figure 3:
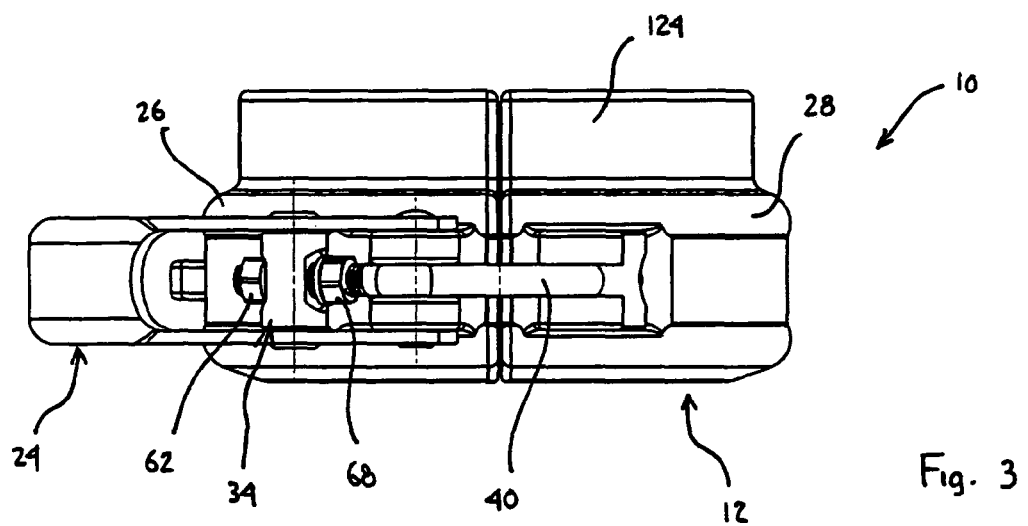
FIG. 3 is an edge view of the coupling of FIG. 2.

As seen in FIGS. 1-3, in one preferred and non-limiting embodiment of the present invention, the first end 42 of the bail arm 40 is threaded and includes an adjustment assembly 60. The adjustment assembly 60 allows the bail 38 to be tightened or adjusted in order to ensure a proper coupling and abutment between the shell arms 14. For example, due to wear-and-tear and extensive use of the coupling 10, the securing assembly 22 may become loose and provide ineffective attachment between the attached parts. Accordingly, the adjustment assembly 60 can be used to manually adjust the securing assembly 22, and specifically the bail 38.

The adjustment assembly 60 may include a lock nut 62 threaded on the bail arm 40, and the lock nut 62 is in direct or indirect contact with a surface 64 of the hinge pin 34. Further, the lock nut 62 is configured or adapted to tighten directly or indirectly against this surface 64 in order to prevent removal of the bail 38 from operational interaction with the hinge pin 34. A washer 66 can be positioned between the lock nut 62 and the surface 64 of the hinge pin 34, such that the lock nut 62 tightens against the washer 66, which is thereby urged against the surface 64 of the hinge pin 34.

The adjustment assembly 60 also includes an adjustment nut 68. The adjustment nut 68 is threaded on the bail arm 40 and is in direct or indirect contact with the surface 64 of the hinge pin 34. In particular, the adjustment nut 68 would be in direct or indirect contact with the surface 64 that is opposing the surface 64 that is in direct or indirect contact with the lock nut 62. The adjustment nut 68 is configured or adapted to tighten directly or indirectly against the surface 64 in order to provide an adjustable abutment surface for the hinge pin 34, thereby providing an adjustment to the overall assembly and coupling 10.

As discussed above, the nesting of the first end 42 of the bail arm 40 limits access to the bail 38 when the coupling 10 is in a closed position. In order to provide additional safety features and tamper proof functionality, and in another preferred and non-limiting embodiment, a disturbance 70 is formed at the distal end 72 of the threaded first end 42 of the bail arm 40. This disturbance 70 ensures that the adjustment assembly 60 cannot be removed. As shown in FIG. 2, the disturbance 70 may be a riveted distal end 72 of the bail arm 40. However, this disturbance 70 can take many forms. For example, the disturbance 70 may be a material applied to the distal end 72 of the bail arm 40, a mechanically applied disturbance 70, a chemically applied disturbance 70, a disturbed thread pattern of the threads on the bail arm 40, etc. The use of this disturbance 70 provides additional and beneficial functionalities of the coupling 10 of the present invention.

Figure 4:
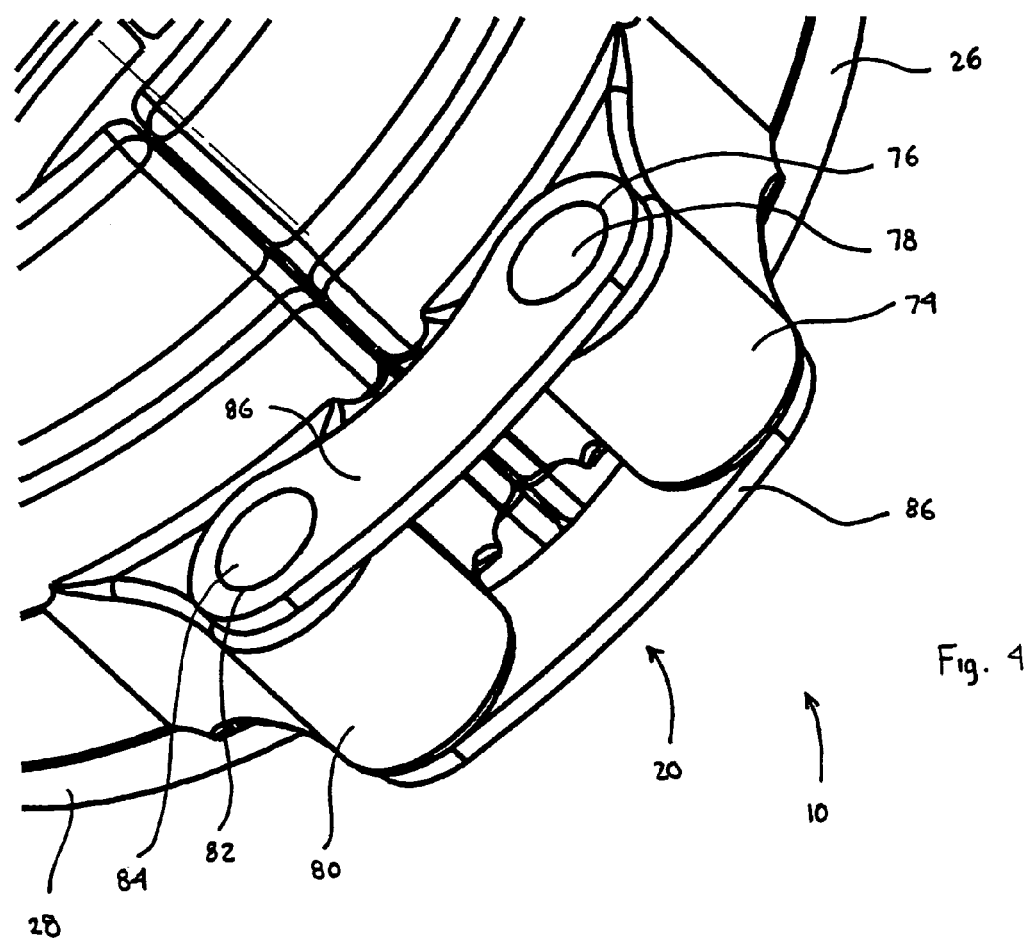
FIG. 4 is a sectional, edge view of the coupling of FIG. 2.

In yet another aspect of the present invention, the coupling 10, and specifically the hinge assembly 20 of the coupling 10, is a double hinge assembly. In particular, as seen in FIG. 4, this double hinge assembly 20 includes a first sleeve 74 attached to the first end 16 of the first shell arm 26. In addition, this first sleeve 74 includes a hinge orifice 76 with a hinge pin 78 extending therethrough. In addition, this double hinge assembly 20 includes a second sleeve 80 attached to the first end 16 of the second arm 28. Further, this second sleeve 80 also includes a hinge orifice 82 with a hinge pin 84 extending therethrough. Finally, in order to complete the hinge assembly 20, the hinge pins 78, 84 are connected at each end by a respective hinge plate 86. It is this structure that completes the double, pintle hinge assembly 20, which prevents crimping or the occurrence of a pinch point at the hinged joint of the coupling arms 14. Therefore, by obviating the occurrence of such a pinch point, the coupled parts are not damaged, and undesirable forces and pressures are not exerted during the coupling process.

Returning to FIGS. 1-3, and in one preferred and non-limiting embodiment, the handle 24 is rotatably attached to the shell 12 via a rotation assembly 88. Specifically, the rotation assembly 88 includes a sleeve 90 attached at or near the second end 18 of the shell arm 14 that opposes the shell arm 14 that includes the boss 50. Further, this sleeve 90 includes a hinge orifice 92 with a hinge pin 94 extending therethrough. A rotation orifice 96 extends through a portion of the first end of the handle 24. Therefore, the hinge pin 94 extends at least partially through the rotation orifice 96, such that the handle is rotatable with respect to the second end 18 of the shell arm 14. In this manner, the handle 24 is rotatable and movable with respect to the shell 12 and shell arms 14.

In a further embodiment, and as seen in FIGS. 1 and 2, the coupling 10, and specifically the bail arm 40, includes a flexion portion 98. This flexion portion 98 extends adjacent the sleeve 90 of the rotation assembly 88 and/or contacts a surface of the sleeve 90 or the hinge pin 94 of the rotation assembly 88. As seen in the figures, e.g., FIG. 6, the flexion portion 98, in one preferred and non-limiting embodiment, is a bend in an intermediate portion 100 of the bail arm 40. This provides a "spring action" to the bail arm 40. Accordingly, this "spring action" provided by the flexion portion 98 also serves to assist in adjusting and otherwise ensuring that the shell arms 14 are tightly sealed against each other. This provides a similar adjustment characteristic and feature as the adjustment assembly 60.

Figure 5:
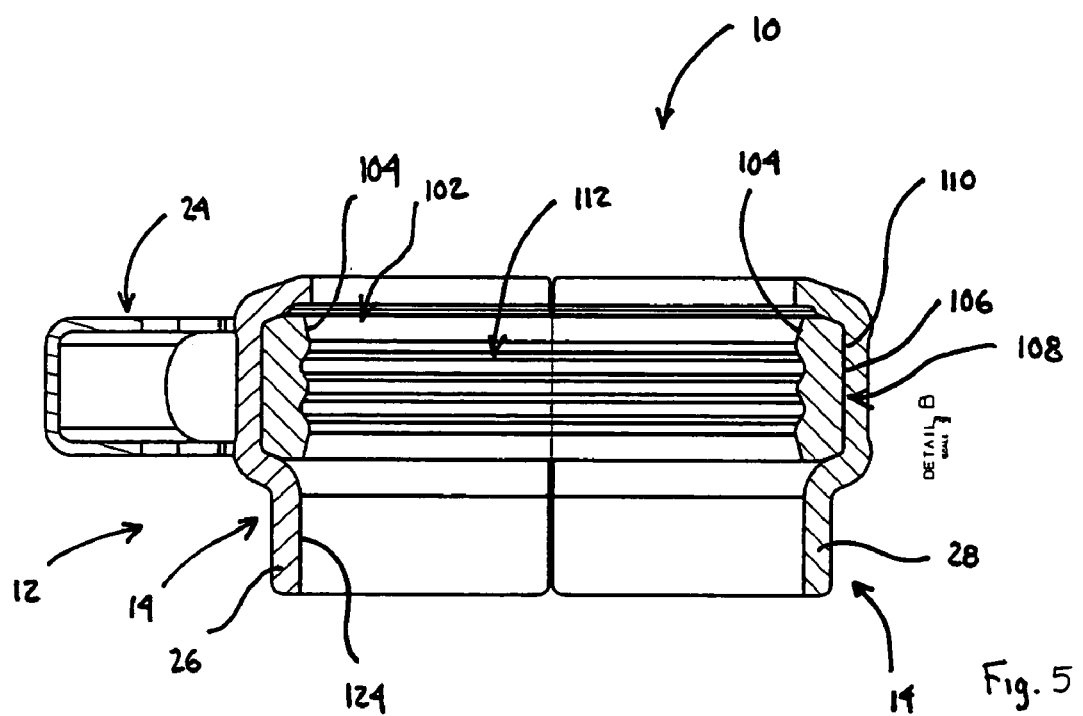
FIG. 5 is an expanded perspective view of a portion of the coupling of FIG. 2.

In another embodiment, and as shown in FIGS. 1, 2 and 5, the coupling 10 includes a substantially circular gasket 102, which includes an inner surface 104 and an outer surface 106. The gasket 102 is positionable within a recessed seat 108 formed along an inner surface of each shell arm 14. In particular, the gasket 102 is receivable within and removable from the recessed seat 108. Further, the outer surface 106 of the gasket 102 is received within and contacts the recessed seat 108 of the shell arms 14.

In order to provide a better seal against the attachable parts or conduits (not shown), the inner surface 104 of the gasket includes at least one, and possibly multiple, projection flanges 112. These projection flanges 112 extend from and along the inner surface 110 of the gasket 102. Still further, these projection flanges 112 are configured, sized and/or shaped to contact and seal against at least a portion of a coupled part (not shown).

As shown in the embodiments of FIGS. 1, 2 and 5, and as best seen in FIG. 5, the inner surface 104 of the gasket 102 includes three projection flanges 112, each of which are configured to urge against and provide a seal with respect to the coupled part in the coupling 10. This gasket 102 can be made from a variety of materials, such as a flexible plastic, polymer, synthetic material, flexible material, rubber, etc. Still further, since the gasket 102 is removable from the recessed seat 108 of the shell arms 14, the gasket 102 may be replaced after a specified amount of wear has occurred.

Yet another safety feature of the present invention is in the form of a strap 114. As seen in FIG. 2, the strap 114 is attachable between the handle 24 and the first shell arm 26 and/or the second shell arm 28. In particular, the strap 114 is configured to prevent rotation of the handle 24 toward and/or away from the shell arms 14.

In the embodiment illustrated in FIG. 2, the strap 114 is attachable between a strap orifice 116 extending through an end of the handle 24, and a strap loop element 118 attached to a portion of at least one of the shell arms 14. In order to provide maximum efficiency and connection, the strap loop element 118 may be positioned substantially opposite the strap orifice 116 of the handle 24.

In operation, after the bail 38 is adjusted and the engagement member 46 of the bail 38 is attached to the groove 48 and slot 52 of the boss 50, the handle 24 is rotated to effect a closure of the shell arms 14. Once closed, the strap 114 is attached between the strap orifice 116 and the strap loop element 118 to provide extra security and tamper resistance to the coupling 10. Accordingly, through use of the strap 114 and the positioning of the first end 42 of the bail arm 40 (within the inner area 58 of the handle body 30), the security features of the coupling 10 of the present invention are maximized.

The coupling 10 may be constructed from a variety of materials. For example, at least a portion of the coupling 10 may be cast from aluminum. Still further, in allowing proper alignment of the shell arms 14 for use in appropriate closure, an alignment assembly 120 may be used. Specifically, this alignment assembly 120 may be used to ensure that, when positioned in an abutting relationship, the shell arms 14 are substantially in alignment. For example, in the embodiment illustrated in FIG. 1, the alignment assembly 120 is in the form of an alignment member 122 extending from an end 16, 18 of at least one shell arm 14. This alignment member 122 ensures that, when closing the shell arms 14, the ends 16, 18 are in proper alignment, although such alignment may also occur during use of the coupling 10. Such a function may be particularly beneficial when using the double hinge assembly 20 discussed above.

In a further embodiment, and as best illustrated in FIGS. 1, 3 and 5, at least one coupling flange 124 may extend from the shell 12. This coupling flange 124 is used in proper alignment and positioning of the coupled part, such as a conduit or pipe. As illustrated in the figures of the present invention, a single coupling flange 124 is used. However, such a coupling flange 124 may be positioned on each side of the shell 12, for coupling parts together. Alternatively, there is no need for a coupling flange 124 to be utilized when operating and attaching parts together using the coupling 10 of the present invention.

In a further embodiment of the present invention, a method of manufacturing the coupling 10 is provided. Specifically, the method includes the steps of: (a) forming the shell 12 having the two semi-circular shell arms 14, each with a first end 16 and a second end 18; (b) movably attaching the first end 16 of the shell arms 14 by a hinge assembly 20; (c) releasably securing the second ends 18 of the shell arms 14 in a substantially abutting relationship by (i) rotatably attaching a handle 24 at or near the second end 18 of one of the shell arms 14, where the handle 24 includes a handle body 30, a hinge orifice 32 extending through a portion of the handle body 30, and a hinge pin 34 extending through the hinge orifice 32, where the hinge pin 34 includes a hinge pin orifice 36 extending therethrough; (ii) providing a T-shaped bail 38 having an arm 40 with a first end 42 and a base portion 44 having an engagement member 46 extending substantially transversely with respect to the bail arm 40; (iii) attaching a boss 50 at or near the second end 18 of the other of the shell F arms 14, where the boss 50 includes a groove 48 for receiving the engagement member 46 of the bail arm 40; and (iv) extending the first end 42 of the bail arm 40 through the hinge pin orifice 36.

In this manner, the present invention provides a coupling 10 with specific and beneficial safety precaution components and functions for protecting against tampering, removal or accidental opening. In addition, the coupling 10 of the present invention provides additional ease of closing and locking the shell arms 14 in an abutting relationship. Still further, the coupling 10 of the present invention avoids the occurrence of a pinch point at the hinge joint of the shell arms 14. In addition, the coupling 10 provides additional safety and tamper resistant or tamper proof characteristics or functions that overcome the drawbacks and deficiencies of the prior art.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A coupling, comprising:
    a shell having two semi-circular shell arms, each with a first end and a second end, the first ends of the shell arms moveably attached by a hinge assembly; and
    a securing assembly configured to releasably secure the second ends of the shell arms in a substantially abutting relationship;
    wherein the securing assembly includes:
        (i) a handle rotatably attached at or near the second end of one of the first shell arm or second shell arm, the handle having:
            (a) a handle body;
            (b) at least one hinge orifice extending through at least a portion of the handle body; and
            (c) a hinge pin extending through the at least one hinge orifice, the hinge pin having an orifice extending therethrough; and
        (ii) a substantially T-shaped bail having an arm with a first end and a base portion having an engagement member extending substantially transversely with respect to the bail arm, wherein the engagement member is configured to mate with a groove positioned on a boss attached at or near the second end of the other of the first shell arm or second shell arm, the first end of the bail arm extending through the hinge pin orifice;
    wherein the bail arm includes a flexion portion for providing spring action to the bail while closing the handle, wherein the flexion portion is a bend in an intermediate portion of the bail arm, thereby providing spring action to the bail arm.

2. The coupling of claim 1, wherein the boss further comprises a slot extending substantially transversely with respect to the groove, the slot configured to seat at least a portion of the bail arm substantially adjacent the engagement member.

3. The coupling of claim 1, wherein the first end of the bail arm is positioned substantially adjacent or at least partially within the handle body.

4. The coupling of claim 1, wherein the handle body comprises an outer wall and at least two side walls, thereby forming an inner area, wherein each side wall includes a respective hinge orifice, the hinge pin extending through each hinge orifice and the hinge pin orifice extending substantially centrally through the hinge pin.

5. The coupling of claim 4, wherein the first end of the bail arm is at least partially positioned within the inner area of the handle body.

6. The coupling of claim 1, wherein the first end of the bail arm is threaded and includes an adjustment assembly.

7. The coupling of claim 6, wherein a disturbance is formed at the distal end of the threaded first end of the bail arm, such that the adjustment assembly cannot be removed.

8. The coupling of claim 7, wherein the disturbance is: (i) a riveted distal end of the bail arm; (ii) a material applied to the distal end of the bail arm; (iii) a mechanically applied disturbance; (iv) a chemically applied disturbance; (v) a disturbed thread pattern of the threads on the bail arm, or any combination thereof.

9. The coupling of claim 6, wherein the adjustment assembly is at least one lock nut threaded on the bail arm and in direct or indirect contact with a surface of the hinge pin, the lock nut configured to tighten directly or indirectly against the surface to prevent removal of the bail from operational interaction with the hinge pin.

10. The coupling of claim 9, further comprising a washer positioned between the lock nut and the surface of the hinge pin, such that the lock nut tightens against the washer, which is urged against the surface of the hinge pin.

11. The coupling of claim 9, further comprising an adjustment nut threaded on the bail arm and in direct or indirect contact with a surface of the hinge pin that is opposing the surface in direct or indirect contact with the lock nut, the adjustment nut configured to tighten directly or indirectly against the surface to provide an adjustable abutment surface for the hinge pin.

12. The coupling of claim 1, wherein the hinge assembly is a double hinge assembly.

13. The coupling of claim 12, wherein the double hinge assembly includes:
    a first sleeve attached to the first end of the first arm and having a hinge orifice with a hinge pin extending therethrough; and
    a second sleeve attached to the first end of the second arm and having a hinge orifice with a hinge pin extending therethrough;
    wherein the hinge pins are attached by at least one hinge plate.

14. The coupling of claim 1, wherein the handle is rotatably attached by a rotation assembly comprising:
    a sleeve attached at or near the second end of the first arm or second arm and having a second hinge orifice with a second hinge pin extending therethrough; and
    a rotation orifice extending through a portion of a first end of the handle;
    wherein the second hinge pin extends at least partially through the rotation orifice, such that the handle is rotatable with respect to the second end of the first arm or second arm.

15. The coupling of claim 14, wherein the handle body comprises an outer wall and at least two side walls, thereby forming an inner area, wherein each side wall includes a rotation orifice extending therethrough, and wherein a respective end of the hinge pin extends at least partially through a respective rotation orifice of each side wall.

16. The coupling of claim 1, further comprising a substantially circular gasket having an inner surface and an outer surface, the gasket positionable within a recessed seat formed along an inner surface of each shell arm.

17. The coupling of claim 16, wherein the gasket is receivable within and removable from the recessed seat, and wherein the outer surface of the gasket is received within and contacts the recessed seat.

18. The coupling of claim 16, wherein the inner surface of the gasket includes at least one projection flange extending from and at least partially along the inner surface and configured to contact and seal against at least a portion of a coupled part.

19. The coupling of claim 1, further comprising a strap attachable between the handle and at least one of the first shell arm and the second shell arm, the strap configured to prevent rotation of the handle towards and away from the shell arm.

20. The coupling of claim 19, wherein the strap is attachable between a strap orifice extending through a second end of the handle and a strap loop element attached to at least a portion of the first shell arm or the second shell arm, the strap loop element positioned substantially opposite the strap orifice of the handle.

21. The coupling of claim 1, wherein at least a portion of the coupling is cast from aluminum.

22. The coupling of claim 1, further comprising an alignment assembly configured to ensure that, when positioned in an abutting relationship, the shell arms are substantially in alignment.

23. A coupling, comprising:
a shell having two semi-circular shell arms, each with a first end and a second end, the first ends of the shell arms moveably attached by a double, pintle hinge assembly; and
a securing assembly configured to releasably secure the second ends of the shell arms in a substantially abutting relationship;
wherein the securing assembly includes:
 (i) a handle rotatably attached at or near the second end of one of the first shell arm or second shell arm, the handle having:
  (a) a handle body;
  (b) at least one hinge orifice extending through at least a portion of the handle body; and
  (c) a hinge pin extending through the at least one hinge orifice, the hinge pin having an orifice extending therethrough; and
 (ii) a substantially T-shaped bail having an arm with a first end and a base portion having an engagement member extending substantially transversely with respect to the bail arm, wherein the engagement member is configured to mate with a groove positioned on a boss attached at or near the second end of the other of the first shell arm or second shell arm, the first end of the bail arm extending through the hinge pin orifice;
wherein the bail arm includes a flexion portion for providing spring action to the bail while closing the handle wherein the flexion portion is a bend in an intermediate portion of the bail arm, thereby providing spring action to the bail arm.

24. A coupling, comprising:
a shell having two semi-circular shell arms, each with a first end and a second end, the first ends of the shell arms moveably attached by a double, pintle hinge assembly; and
a securing assembly configured to releasably secure the second ends of the shell arms in a substantially abutting relationship;
wherein the securing assembly includes:
 (i) a handle rotatably attached at or near the second end of one of the first shell arm or second shell arm, the handle having:
  (a) a handle body;
  (b) at least one hinge orifice extending through at least a portion of the handle body; and
  (c) a hinge pin extending through the at least one hinge orifice, the hinge pin having an orifice extending therethrough; and
 (ii) a substantially T-shaped bail having an arm with a first end and a base portion having an engagement member extending substantially transversely with respect to the bail arm, wherein the engagement member is configured to mate with a groove positioned on a boss attached at or near the second end of the other of the first shell arm or second shell arm, the first end of the bail arm extending through the hinge pin orifice;
wherein the first end of the bail arm is threaded and includes an adjustment assembly;
wherein the adjustment assembly is at least one lock nut threaded on the bail arm and in direct or indirect contact with a surface of the hinge pin, the lock nut configured to tighten directly or indirectly against the surface to prevent removal of the bail from operational interaction with the hinge pin;
further comprising an adjustment nut threaded on the bail arm and in direct or indirect contact with a surface of the hinge pin that is opposing the surface in direct or indirect contact with the lock nut, the adjustment nut configured to tighten directly or indirectly against the surface to provide an adjustable abutment surface for the hinge pin.

25. A coupling, comprising:
a shell having two semi-circular shell arms, each with a first end and a second end, the first ends of the shell arms moveably attached by a hinge assembly; and
a securing assembly configured to releasably secure the second ends of the shell arms in a substantially abutting relationship;
wherein the securing assembly includes:
 (i) a handle rotatably attached at or near the second end of one of the first shell arm or second shell arm, the handle having:
  (a) a handle body;
  (b) at least one hinge orifice extending through at least a portion of the handle body; and
  (c) a hinge pin extending through the at least one hinge orifice, the hinge pin having an orifice extending therethrough; and
 (ii) a substantially T-shaped bail having an arm with a first end and a base portion having an engagement member extending substantially transversely with respect to the bail arm, wherein the engagement member is configured to mate with a groove positioned on a boss attached at or near the second end of the other of the first shell arm or second shell arm, the first end of the bail arm extending through the hinge pin orifice;

wherein the first end of the bail arm is threaded and includes an adjustment assembly;

wherein the adjustment assembly is at least one lock nut threaded on the bail arm and in direct or indirect contact with a surface of the hinge pin, the lock nut configured to tighten directly or indirectly against the surface to prevent removal of the bail from operational interaction with the hinge pin; further comprising an adjustment nut threaded on the bail arm and in direct or indirect contact with a surface of the hinge pin that is opposing the surface in direct or indirect contact with the lock nut, the adjustment nut configured to tighten directly or indirectly against the surface to provide an adjustable abutment surface for the hinge pin.

* * * * *

UNITED STATES PATENT AND TRADEMARK OFFICE
CERTIFICATE OF CORRECTION

| | | |
|---|---|---|
| PATENT NO. | : 7,828,340 B2 | Page 1 of 1 |
| APPLICATION NO. | : 11/583947 | |
| DATED | : November 9, 2010 | |
| INVENTOR(S) | : Heelan, Jr. et al. | |

It is certified that error appears in the above-identified patent and that said Letters Patent is hereby corrected as shown below:

Column 11, Line 1, Claim 15, "of the hinge pin" should read -- of the second hinge pin --

Signed and Sealed this
Eighth Day of March, 2011

David J. Kappos
*Director of the United States Patent and Trademark Office*